Oct. 31, 1961  J. G. WALLNY  3,006,479
FILTER DEVICES
Filed Aug. 18, 1960  3 Sheets-Sheet 1
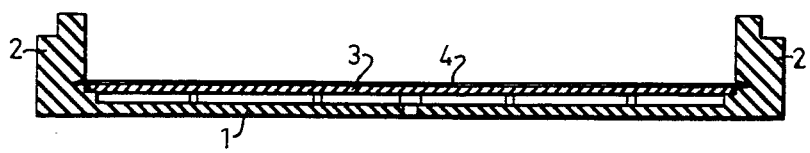
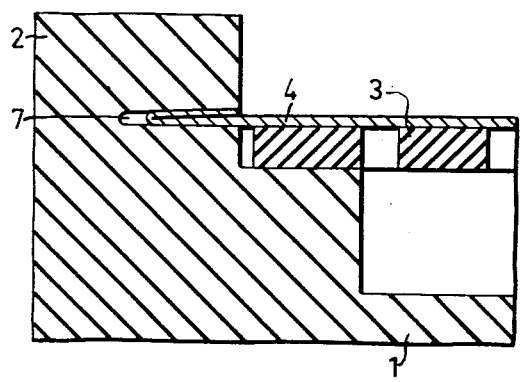
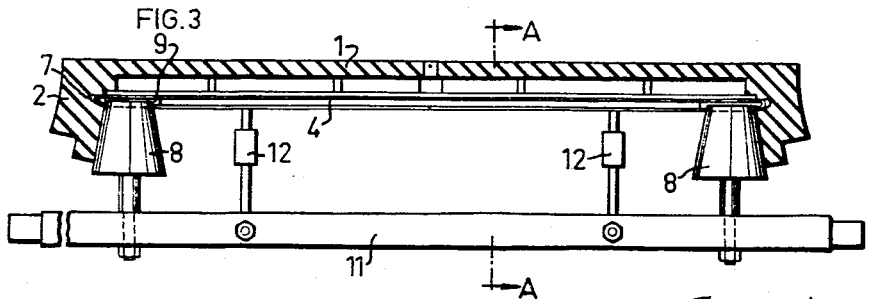
Inventor:
John Gunnar Wallny
By Wenderoth, Lind & Ponack
Attys.

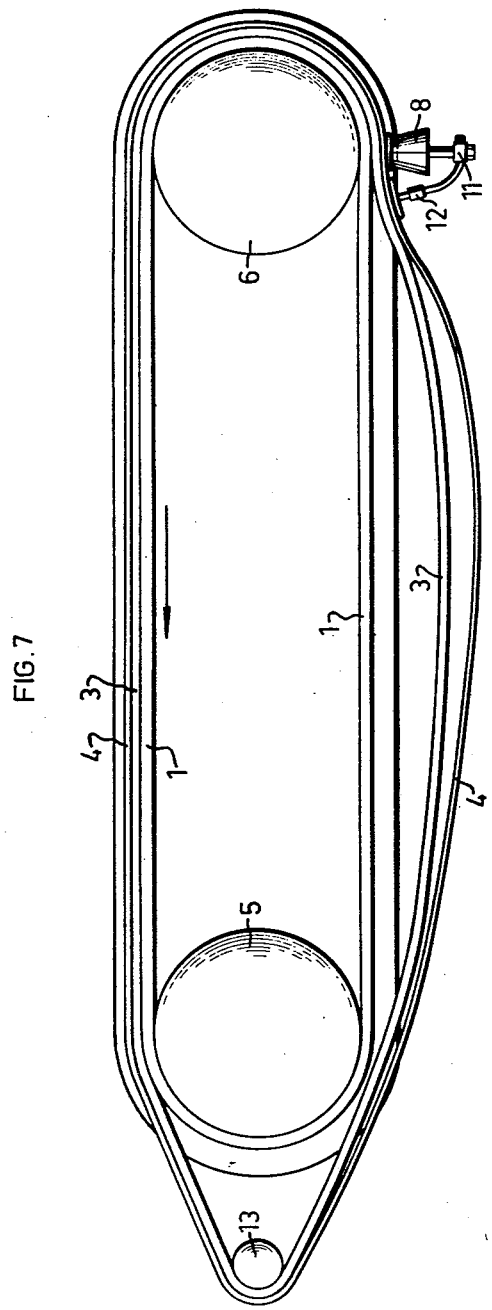

United States Patent Office 3,006,479
Patented Oct. 31, 1961

3,006,479
FILTER DEVICES
John Gunnar Wallny, Landskrona, Sweden, assignor to Aktiebolaget Forenade Superfosfatfabriker, Landskrona, Sweden, a corporation of Sweden
Filed Aug. 18, 1960, Ser. No. 50,373
Claims priority, application Sweden Sept. 11, 1959
8 Claims. (Cl. 210—401)

This invention relates to a filter device of the endless belt type in which filtration continuously takes place on the upper run of an endless filter cloth placed around an endless carrier belt travelling over rolls at the ends of the filter device, the said upper run of the filter cloth resting on said carrier belt but the lower run thereof depending loosely below the same.

The design of the filter devices as outlined above permits the two sides of the filter cloth to be continuously flushed and washed and moreover an easy flushing of the carrier belt. In filter devices so designed it has, however, been necessary hitherto to have the filter cloth loosely resting on the carrier belt. This is sometimes a disadvantage in the operation of the filter device, as the advance of the filter cloth is realized merely by the friction thereof against the carrier belt, for which reason a fully uniform advance may not be attained.

The arrangement provided by the present invention solves the problem of holding the filter cloth at the upper run thereof attached to the carrier belt but permitting it to depend loosely at the lower run thereof, free from the carrier belt. This arrangement is characterized by the feature that the upper run of the filter cloth is attached with its edges to the carrier belt, and that means are provided for continuously releasing the filter cloth from the carrier belt at the transition from the upper to the lower run and for again attaching the filter cloth to the carrier belt at the transition from the lower to the upper run.

The above described and further features of the invention and the advantages thereof will become apparent from the following description, reference being made to the accompanying drawings, in which:

FIG. 1 is a cross section of a carrier belt and a filter cloth resting thereon;

FIG. 2 is a fragment of the cross section in FIG. 1 on a larger scale;

FIG. 3 is a view of part of the arrangement at the underside of the filter device with the carrier belt in cross section;

FIG. 7 is a side elevational view of a filter device assembly equipped with a modification of the arrangement of the invention.

Figure 4:
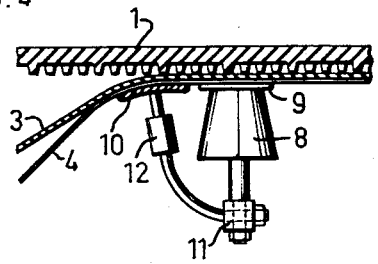
FIG. 4 is a section on line A—A in FIG. 3.

The filter device illustrated in the drawing comprises an endless carrier belt 1, preferably of rubber with reinforcing fabric embedded therein, having marginal ribs 2 projecting at its longitudinal edges, a perforated intermediate belt 3 of rubber which rests on the carrier belt between the marginal ribs thereof and is supported on upstanding transverse ribs provided on the belt 1, and a filter cloth 4 in turn resting on the intermediate belt 3. The carrier belt travels over rotatable turning rolls 5 and 6 located each at one end of the filter device. The roll 5 is driven by a drive (not shown) of any suitable type.

In each of its two marginal ribs 2 the carrier belt 1 has a longitudinal slot 7 at such a level over the top of the belt that the longitudinal margins of the filter cloth 4 resting on the intermediate belt 3 project each into one of the slots at the upper run of said cloth. The slots are of such a width that said longitudinal margins are held clamped therein.

Figure 5:
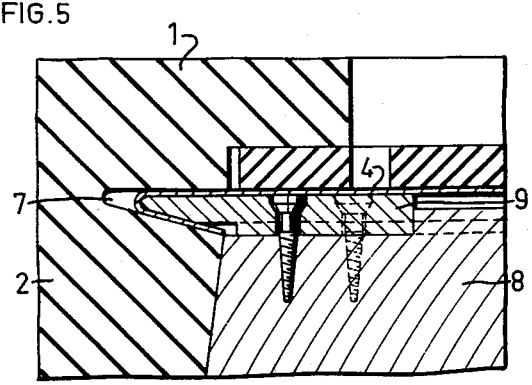
FIG. 5 is a fragment of the same part of the arrangement as in FIG. 3 but on a larger scale and altogether in cross section.
Figure 6:
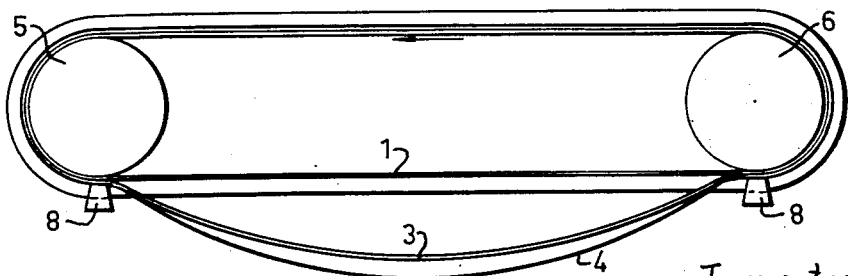
FIG. 6 is a side elevational view of a filter device assembly equipped with the arrangement of the invention.

To enable the filter cloth 4 to be continuously released from the carrier belt at the transition from the upper to the lower run, i.e. adjacent the roll 5, and to be attached again to the carrier belt 1 at the transition from the lower to the upper run, i.e. at the roll 6, so that the lower run of the filter cloth may depend loosely below the carrier belt like in the prior art devices referred to above, in spite of the upper run of the filter cloth being held to the carrier belt 1, there are provided means in the form of rotatable conical rolls 8 with vertical shafts, two at each end of the filter device, beneath the respective roll 5 or 6, respectively, said rolls 8 engaging the inner side of each of the marginal ribs 2, as shown in FIGS. 3 and 5. At the travel of the carrier belt 1 past these rolls 8 which are thereby caused to rotate, the rolls bend the marginal ribs outwards, as seen in said figures, whereby the slots 7 are widened. At the transition from the upper to the lower run the filter cloth 4 will thus be released and slide out of the slots, and at the transition from the lower to the upper run the cloth can be re-engaged with the slots. This latter operation is facilitated by the conical rolls 8 at that end of the filter device being provided at their upper smaller ends with a thin disk 9 of plastic or like material which projects around said end and presses the edges of the filter cloth 4 into the slots 7. Disposed at this end of the filter device, beneath the device and across the whole width thereof, is preferably a guide plate 10 which before the arrival of the filter cloth 4 at the conical rolls 8 serves to raise the cloth to a more horizontal position, which further facilitates the insertion of the cloth margins into the slots. The guide plate 10 is preferably secured to a transverse supporting rod 11 which also carries the shafts of the rolls 8. The height position of the guide plate 10 is adjustable by means of screws 12. It would also be possible to have those rolls 8 situated adjacent the roll 6 mounted in a position different from that shown in FIG. 6, e.g. in a diametrically opposite position, that is at the top of the carrier belt by the aid of appropriate attachment means, in which case the guide plate 10, the supporting rod 11 and the screws 12 may be omitted because the filter cloth 4 is then already in the proper position so that it can be inserted into the slots 7 of the carrier belt 1.

It should be observed that the intermediate belt 3, the lower run of which also depends loosely below the carrier belt 1, is likewise guided by the guide plate 10 at the transition to the upper run and is forced to take the correct position on the carrier belt.

The means for bending the marginal ribs 2 of the carrier belt 1 outwards need not necessarily be conical rolls but may also have the shape of cylindrical rolls, the axes of which are inclined to the carrier belt in a plane transverse thereto, or the shape of sliding rails exerting a pressure on the marginal ribs to widen the slots 7.

Furthermore, the conical rolls 8 may be dispensed with at that end of the filter device where the transition from the upper to the lower run takes place, and there may instead be arranged outside the roll 5 (see FIG. 7) an auxiliary roll 13 which is parallel to the roll 5 and extends over the whole width of the filter device, at least the filter cloth 4 or possibly, as shown in FIG. 7, both the filter cloth 4 and the intermediate belt 3, instead of passing around the roll 5 close to the carrier belt 1, forming a loop spaced from the carrier belt and travelling around the auxiliary roll 13. By this arrangement the margins of the filter cloth will be withdrawn from the slots in the marginal ribs of the carrier belt when this belt reaches the roll 5.

Finally, it should be pointed out that the intermediate belt 3 which is previously known and is a part of the device which does not form any characteristic feature of the invention, could possibly be dispensed with.

Other modifications of the device described above as an illustrative example of the invention may be conceived by those skilled in the art without exceeding the scope of the invention.

What I claim and desire to secure by Letters Patent is:

1. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, means for continuously releasing the filter cloth from said rib means at the transition of said filter cloth from the upper to the lower run, and means for continuously deflecting said rib means outwardly at the transition of the filter cloth from the lower to the upper run thereby widening said slots to allow the margins of said filter cloth to enter the same causing said cloth to be confined again by said rib means and attached to said belt.

2. A filter device as claimed in claim 1, in which said deflecting means consist of a pair of rolls mounted adjacent the belt supporting roll at the transition of the filter cloth from the lower to the upper run in an angular relation to said carrier belt enabling them to engage the inner face of said rib means for deflecting said rib means outwardly.

3. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, means for continuously deflecting said rib means at the transition of the filter cloth from the upper to the lower run thereby widening said slots to release the filter cloth, and means for continuously deflecting said rib means at the transition of the filter cloth from the lower to the upper run thereby widening said slots to allow the margins of said filter cloth to enter the same causing said cloth to be confined again by said rib means and attached to said belt.

4. A filter device as claimed in claim 3, in which said deflecting means consist of two pairs of rolls mounted respectively adjacent the belt supporting roll at the transition of the filter cloth from the upper to the lower run and adjacent the belt supporting roll at the transition of the filter cloth from the lower to the upper run in angular relations to said carrier belt enabling them to engage the inner face of said rib means for deflecting said rib means outwardly.

5. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, auxiliary roll means positioned beyond the belt supporting roll at the transition of the filter cloth from the upper to the lower run parallel with said supporting roll and extending throughout the width of said carrier belt, the filter cloth forming a loop around said auxiliary roll means forcibly drawn out of the slots in said rib means, and means for continuously deflecting said rib means outwardly at the transition of the filter cloth from the lower to the upper run thereby widening said slots to allow the margins of said filter cloth to enter the same causing said cloth to be confined again by said rib means and attached to said belt.

6. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, means for continuously releasing the filter cloth from said rib means at the transition of said filter cloth from the upper to the lower run, a pair of conical rolls mounted adjacent the belt supporting roll at the transition of the filter cloth from the lower to the upper run with their axes at right angles to the carrier belt, said conical rolls engaging the inner face of said rib means for deflecting said rib means outwardly thereby widening said slots, and means on said conical rolls for causing the margins of the filter cloth to enter said slots and said cloth to be confined again by said rib means and attached to said belt.

7. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, means for continuously releasing the filter cloth from said rib means at the transition of said filter cloth from the upper to the lower run, a pair of conical rolls mounted adjacent the belt supporting roll at the transition of the filter cloth from the lower to the upper run with their axes at right angles to the carrier belt, said conical rolls engaging the inner face of said rib means for deflecting said rib means outwardly thereby widening said slots, and disc means provided at the small ends of said conical rolls adjacent said carrier belt projecting around said ends for causing the margins of said filter cloth to enter said slots and said cloth to be confined again by said rib means and attached to said belt.

8. A filter device comprising a pair of horizontal parallel spaced rotatable rolls, a traveling endless carrier belt supported around said rolls, an endless filter cloth placed around said carrier belt, the upper run of said filter cloth resting on said carrier belt but the lower run depending loosely below the same, rib means on said carrier belt along the longitudinal edges thereof, each rib having a longitudinal slot in the inner face thereof, the upper run of said filter cloth being confined between said rib means and attached to said carrier belt by having each of its longitudinal margins inserted into the said slot in the adjacent rib, means for continuously releasing the filter cloth from said rib means at the transition of said filter cloth from the upper to the lower run, a pair of conical rolls mounted below said carrier belt adjacent the belt supporting roll at the transition of the filter cloth from the lower to the upper run with their axes at right angles to the carrier belt, said conical rolls engaging the inner face of said rib means for deflecting said rib means outwardly thereby widening said slots, means on said conical rolls for causing the margins of the filter cloth to enter said slots and said cloth to be confined again by said rib means and attached to said belt, and guide means engaging the lower run of said filter cloth before the arrival thereof at said conical rolls for raising said lower run into contact with the carrier belt near said belt supporting roll.

References Cited in the file of this patent

FOREIGN PATENTS 1,182,032     France _____ Jan. 12, 1959